United States Patent
Manjunath et al.

(10) Patent No.: US 12,259,798 B2
(45) Date of Patent: Mar. 25, 2025

(54) AUTOMATICALLY IMPLEMENTING A SPECIFICATION OF A DATA PROTECTION INTENT

(71) Applicant: Cohesity, Inc., San Jose, CA (US)

(72) Inventors: Chinmaya Manjunath, San Jose, CA (US); Colin Scott Johnson, San Francisco, CA (US); Amitabh Sinha, Fremont, CA (US); Dayanand Sharma, Santa Clara, CA (US); Prakash Veljibhai Vaghela, Pune (IN); Karandeep Singh Chawla, Santa Clara, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 18/229,008

(22) Filed: Aug. 1, 2023

(65) Prior Publication Data
US 2024/0020209 A1    Jan. 18, 2024

Related U.S. Application Data

(63) Continuation of application No. 17/534,226, filed on Nov. 23, 2021, now Pat. No. 11,768,745.
(Continued)

(51) Int. Cl.
*G06F 11/00* (2006.01)
*G06F 11/14* (2006.01)
(Continued)

(52) U.S. Cl.
CPC ........ *G06F 11/2023* (2013.01); *G06F 11/008* (2013.01); *G06F 11/1448* (2013.01); *G06F 11/1458* (2013.01); *G06F 11/3051* (2013.01)

(58) Field of Classification Search
CPC .............. G06F 11/2023; G06F 11/008; G06F 11/1448; G06F 11/1458; G06F 11/3051; G06F 11/0727; G06F 11/0712; G06F 11/142; G06F 11/3006; G06F 11/3001; G06F 11/3034
See application file for complete search history.

(56) References Cited

U.S. PATENT DOCUMENTS 7,421,648 B1    9/2008    Davis
7,437,764 B1    10/2008   Sobel
(Continued)

OTHER PUBLICATIONS

"Backup Solution Guide"—Synology https://download.synology.com/download/www-res/brochure/backup_solution_guide_en-global .pdf (Year: 2019).
(Continued)

*Primary Examiner* — Joseph D Manoskey
(74) *Attorney, Agent, or Firm* — Shumaker & Sieffert, P.A.

(57) ABSTRACT

A current configuration of one or more data management services is monitored. It is determined that the current configuration is insufficient to achieve a data protection intent indicated by a specification of the data protection intent. In response to determining that the current configuration is insufficient to achieve the data protection intent indicated by the specification of the data protection intent, the current configuration of the one or more data management services is modified in a manner to achieve the data protection intent indicated by the specification of the data protection intent.

20 Claims, 6 Drawing Sheets

Related U.S. Application Data

(60) Provisional application No. 63/122,723, filed on Dec. 8, 2020.

(51) Int. Cl.
*G06F 11/20* (2006.01)
*G06F 11/30* (2006.01)

(56) References Cited

U.S. PATENT DOCUMENTS

| | | | |
|---|---|---|---|
| 8,020,037 | B1 | 9/2011 | Schwartz |
| 8,086,585 | B1 | 12/2011 | Brashers |
| 8,112,661 | B1 | 2/2012 | La France |
| 8,190,583 | B1 | 5/2012 | Shekar |
| 8,261,122 | B1 * | 9/2012 | Kappel .................. G06F 11/34 714/33 |
| 8,312,471 | B2 | 11/2012 | Davis |
| 8,364,648 | B1 | 1/2013 | Sim-Tang |
| 8,607,342 | B1 | 12/2013 | Liao |
| 9,268,689 | B1 | 2/2016 | Chen |
| 9,304,864 | B1 | 4/2016 | Bushman |
| 9,311,190 | B1 | 4/2016 | Bushman |
| 9,361,185 | B1 | 6/2016 | Bushman |
| 9,471,441 | B1 | 10/2016 | Lyadvinsky |
| 9,489,230 | B1 | 11/2016 | Patwardhan |
| 9,594,514 | B1 | 3/2017 | Bono |
| 9,621,428 | B1 | 4/2017 | Lev |
| 9,983,812 | B1 | 5/2018 | Don |
| 10,037,223 | B2 | 7/2018 | Park |
| 10,089,148 | B1 | 10/2018 | Blitzer |
| 10,162,528 | B2 | 12/2018 | Sancheti |
| 10,169,077 | B1 | 1/2019 | Sigl, Sr. |
| 10,175,896 | B2 | 1/2019 | Battaje |
| 10,275,321 | B1 | 4/2019 | Bajaj |
| 10,496,497 | B1 | 12/2019 | Yadav |
| 10,503,612 | B1 | 12/2019 | Wang |
| 10,545,776 | B1 | 1/2020 | Kowalski |
| 10,877,928 | B2 | 12/2020 | Nagrale |
| 10,896,097 | B1 | 1/2021 | Purcell |
| 10,990,284 | B1 * | 4/2021 | Savir ....................... G06F 3/065 |
| 11,036,594 | B1 * | 6/2021 | Shats .................. G06F 11/1461 |
| 11,176,154 | B1 | 11/2021 | Dasgupta |
| 11,768,745 | B2 | 9/2023 | Manjunath et al. |
| 2003/0033344 | A1 | 2/2003 | Abbott |
| 2004/0250033 | A1 | 12/2004 | Prahlad |
| 2006/0069861 | A1 | 3/2006 | Amano |
| 2006/0182255 | A1 | 8/2006 | Luck, Jr. |
| 2006/0236061 | A1 * | 10/2006 | Koclanes ............. G06F 3/0631 711/170 |
| 2007/0153675 | A1 | 7/2007 | Baglin |
| 2008/0208926 | A1 | 8/2008 | Smoot |
| 2009/0089657 | A1 | 4/2009 | Davis |
| 2009/0171707 | A1 | 7/2009 | Bobak |
| 2009/0300409 | A1 * | 12/2009 | Bates .................... G06F 11/008 714/E11.144 |
| 2009/0313503 | A1 | 12/2009 | Atluri |
| 2010/0031170 | A1 | 2/2010 | Carullo |
| 2010/0070725 | A1 | 3/2010 | Prahlad |
| 2010/0106933 | A1 | 4/2010 | Kamila |
| 2010/0122248 | A1 | 5/2010 | Robinson |
| 2011/0022879 | A1 | 1/2011 | Chavda |
| 2011/0106776 | A1 | 5/2011 | Torbjorn |
| 2011/0107246 | A1 | 5/2011 | Torbjorn |
| 2012/0089572 | A1 * | 4/2012 | Raichstein .......... G06F 11/1461 707/645 |
| 2012/0203742 | A1 | 8/2012 | Goodman |
| 2013/0006943 | A1 | 1/2013 | Chavda |
| 2013/0179481 | A1 | 7/2013 | Halevy |
| 2013/0191347 | A1 | 7/2013 | Bensinger |
| 2013/0219135 | A1 | 8/2013 | Knowles |
| 2013/0227558 | A1 | 8/2013 | Du |
| 2013/0232480 | A1 | 9/2013 | Winterfeldt |
| 2013/0232497 | A1 | 9/2013 | Jalagam |
| 2013/0254402 | A1 | 9/2013 | Vibhor |
| 2013/0322335 | A1 | 12/2013 | Smith |
| 2014/0040206 | A1 | 2/2014 | Ramakrishnan |
| 2014/0052692 | A1 | 2/2014 | Zhang |
| 2014/0059306 | A1 | 2/2014 | Bender |
| 2014/0165060 | A1 | 6/2014 | Muller |
| 2014/0297588 | A1 | 10/2014 | Babashetty |
| 2014/0359229 | A1 | 12/2014 | Cota-Robles |
| 2014/0372553 | A1 | 12/2014 | Blackburn |
| 2015/0193487 | A1 | 7/2015 | Demidov |
| 2015/0254150 | A1 | 9/2015 | Gordon |
| 2015/0278046 | A1 | 10/2015 | Zellermayer |
| 2015/0347242 | A1 | 12/2015 | Martos |
| 2015/0363270 | A1 | 12/2015 | Hammer |
| 2015/0370502 | A1 | 12/2015 | Aron |
| 2015/0378765 | A1 | 12/2015 | Singh |
| 2016/0004450 | A1 | 1/2016 | Lakshman |
| 2016/0034356 | A1 | 2/2016 | Aron |
| 2016/0048408 | A1 | 2/2016 | Madhu |
| 2016/0070714 | A1 | 3/2016 | D Sa |
| 2016/0085636 | A1 | 3/2016 | Dornemann |
| 2016/0125059 | A1 | 5/2016 | Jain |
| 2016/0162378 | A1 | 6/2016 | Garlapati |
| 2016/0188898 | A1 | 6/2016 | Karinta |
| 2016/0203060 | A1 | 7/2016 | Singh |
| 2016/0232061 | A1 | 8/2016 | Gaschler |
| 2016/0321339 | A1 | 11/2016 | Tekade |
| 2016/0357640 | A1 | 12/2016 | Bushman |
| 2016/0357641 | A1 | 12/2016 | Bushman |
| 2016/0357769 | A1 | 12/2016 | Bushman |
| 2017/0031613 | A1 | 2/2017 | Lee |
| 2017/0031622 | A1 | 2/2017 | Nagarajan |
| 2017/0060710 | A1 | 3/2017 | Ramani |
| 2017/0060884 | A1 | 3/2017 | Goodman |
| 2017/0123935 | A1 | 5/2017 | Pandit |
| 2017/0139791 | A1 * | 5/2017 | Hagan ................ G06F 11/1402 |
| 2017/0168903 | A1 | 6/2017 | Dornemann |
| 2017/0185491 | A1 | 6/2017 | Hajare |
| 2017/0185729 | A1 | 6/2017 | Boray |
| 2017/0193116 | A1 | 7/2017 | Wong |
| 2017/0206212 | A1 | 7/2017 | Srivilliputtur Mannarswamy |
| 2017/0212680 | A1 | 7/2017 | Waghulde |
| 2017/0337109 | A1 | 11/2017 | Ramu |
| 2018/0004437 | A1 | 1/2018 | Battaje |
| 2018/0004764 | A1 | 1/2018 | Sudarsanam |
| 2018/0060106 | A1 | 3/2018 | Madtha |
| 2018/0060187 | A1 | 3/2018 | Chavda |
| 2018/0081766 | A1 | 3/2018 | Ghuge |
| 2018/0081902 | A1 | 3/2018 | Mckenzie |
| 2018/0088973 | A1 | 3/2018 | Subhraveti |
| 2018/0095846 | A1 | 4/2018 | Sanakkayala |
| 2018/0113625 | A1 | 4/2018 | Sancheti |
| 2018/0196820 | A1 | 7/2018 | Kremer |
| 2018/0212896 | A1 | 7/2018 | Chang |
| 2018/0253414 | A1 | 9/2018 | Hailpern |
| 2018/0293374 | A1 | 10/2018 | Chen |
| 2018/0316577 | A1 | 11/2018 | Freeman |
| 2018/0329637 | A1 | 11/2018 | Battaje |
| 2019/0065277 | A1 | 2/2019 | Raikov |
| 2019/0073276 | A1 | 3/2019 | Yuen |
| 2019/0108266 | A1 | 4/2019 | Manvar |
| 2019/0129799 | A1 | 5/2019 | Kumarasamy |
| 2019/0132203 | A1 | 5/2019 | Wince |
| 2019/0197020 | A1 | 6/2019 | Yap |
| 2019/0215358 | A1 | 7/2019 | Kobayashi |
| 2019/0220198 | A1 | 7/2019 | Kashi Visvanathan |
| 2019/0228097 | A1 | 7/2019 | Kassa |
| 2019/0278662 | A1 | 9/2019 | Nagrale |
| 2019/0278663 | A1 | 9/2019 | Mehta |
| 2020/0026538 | A1 | 1/2020 | Cui |
| 2020/0034254 | A1 | 1/2020 | Natanzon |
| 2020/0057567 | A1 | 2/2020 | Hutcheson |
| 2020/0057669 | A1 | 2/2020 | Hutcheson |
| 2020/0110755 | A1 | 4/2020 | Waldman |
| 2020/0159625 | A1 | 5/2020 | Hutcheson |
| 2020/0167238 | A1 | 5/2020 | Killamsetti |
| 2020/0183794 | A1 | 6/2020 | Dwarampudi |
| 2020/0233571 | A1 | 7/2020 | Yuravlivker |
| 2020/0278274 | A1 | 9/2020 | Shetty |
| 2020/0285449 | A1 | 9/2020 | Mcintosh |

(56) References Cited

U.S. PATENT DOCUMENTS

| | | | |
|---|---|---|---|
| 2020/0394072 | A1 | 12/2020 | Sreekantaswamy |
| 2021/0056203 | A1 | 2/2021 | Qiao |
| 2021/0081087 | A1 | 3/2021 | Wayne |
| 2021/0103556 | A1 | 4/2021 | Nagrale |
| 2021/0232579 | A1 | 7/2021 | Schechter |
| 2021/0318851 | A1 | 10/2021 | Sahu |
| 2021/0382771 | A1 | 12/2021 | Schniebel |
| 2021/0385254 | A1 | 12/2021 | Pettit |
| 2022/0035714 | A1 | 2/2022 | Schultz |

OTHER PUBLICATIONS

"Recovering File from an Amazon EBS vol. Backup"—Josh Rad, AWS, Feb. 1, 2019 https://aws.amazon.com/blogs/compute/recovering-files-from-an-amazon-ebs-volume-backup/ (Year: 2019).

Actifio. "Getting Started with Actifio VDP." Sep. 23, 2020. https://web.archive.org/web/20200923181125/https://docs.actifio.com/10.0/PDFs/Introducing.pdf (Year: 2020).

C. Grace. "Site Recovery Manager Technical Overview." Dec. 1, 2020. https://web.archive.org/web/20201201181602/ https://core.vmware.com/resource/site-recovery-manager-technical-overview (Year: 2020).

Cloud Endure. "Cloud Endure Documentation." Dec. 1, 2020. https://web.archive.org/web/20201201022045/https://docs.cloudendure.com/CloudEndure%20Documentation.htm (Year: 2020).

Cohesity, Cohesity Data Protection White Paper, 2016, Cohesity, pp. 1-12 (Year: 2016).

Gaetan Castlelein, Cohesity SnapFS and SnapTree, Aug. 9, 2017, Cohesity, pp. 1-4 (Year: 2017).

M. Chuang. "Announcing VMware Cloud Disaster Recovery." Sep. 29, 2020. https://web.archive.org/web/20201102133037/https://blogs.vmware.com/virtualblocks/2020/09/29/announcing-vmware-cloud-disaster-recovery/ (Year: 2020).

M. McLaughlin. "VMware Cloud Disaster Recovery is Now Available." Oct. 20, 2020. https://web.archive.org/web/20201103021801/https://blogs.vmware.com/virtualblocks/2020/10/20/vmware-cloud-disaster-recovery-is-now-available/ (Year: 2020).

Red Hat. "Red Hat Virtualization 4.3 Disaster Recovery Guide." Jul. 17, 2019. https://web.archive.org/web/20190717013417/https://access.redhat.com/documentation/en-us/red_hat_virtualization/4.3/html/disaster_recovery_guide/index (Year: 2019).

Red Hat. "Red Hat Virtualization 4.3 Product Guide." Jul. 17, 2019. https://web.archive.org/web/20190717013254/https://access.redhat.com/documentation/en-us/red_hat_ virtualization/4.3/html/product_guide/index (Year: 2019).

VMware. "Site Recovery Manager Administration." May 31, 2019. https://docs.vmware.com/en/Site-Recovery-Manager/8.5/srm-admin-8-5.pdf (Year: 2019).

VMware. "Site Recovery Manager Evaluation Guide." Oct. 19, 2020. https://web.archive.org/web/20201019155135/ https://core.vmware.com/resource/site-recovery-manager-evaluation-guide (Year: 2020).

Zerto. "Zerto Disaster Recovery Guide." Sep. 2016. https://www.zerto.com/wp-content/uploads/2016/09/Zerto-Disaster-Recovery-Guide_CIO_eBook.pdf (Year: 2016).

Prosecution History from U.S. Appl. No. 17/534,226, now issued U.S. Pat. No. 11,768,745, dated Nov. 25, 2022 through May 4, 2023, 29 pp.

* cited by examiner

AUTOMATICALLY IMPLEMENTING A SPECIFICATION OF A DATA PROTECTION INTENT

CROSS REFERENCE TO OTHER APPLICATIONS

This application is a continuation of U.S. patent application Ser. No. 17/534,226 entitled AUTOMATICALLY IMPLEMENTING A SPECIFICATION OF A DATA PROTECTION INTENT filed Nov. 23, 2021, which claims priority to U.S. Provisional Patent Application No. 63/122,723 entitled AUTOMATICALLY IMPLEMENTING A SPECIFICATION OF A DATA PROTECTION INTENT filed Dec. 8, 2020, each of which is incorporated herein by reference for all purposes.

BACKGROUND OF THE INVENTION

A data management provider may provide a plurality of data management services, such as backup, restore, disaster recovery, replication, migration, analytics, compliance, security, etc. The data management provider may provide the data management services for a plurality of objects associated with an entity. Examples of objects include files, databases, virtual machines, applications, volumes, containers, pods, etc. An entity may correspond to a user, an individual, an enterprise, a government, a company, an institution, an organization, etc.

The plurality of objects associated with the entity may be stored in one or more datacenters associated with the entity and/or a cloud storage associated with the entity. A datacenter may include, one or more storage systems, such as a source system and a backup system. Each time the data management provider performs one of the data management services, a user associated with the entity may need to directly specify one or more objects to which the data management service applies. This can be a cumbersome process when the data management provider performs the plurality of data management services with respect to a large number of objects within and/or across datacenters.

BRIEF DESCRIPTION OF THE DRAWINGS

Various embodiments of the invention are disclosed in the following detailed description and the accompanying drawings.

DETAILED DESCRIPTION

Figure 1:
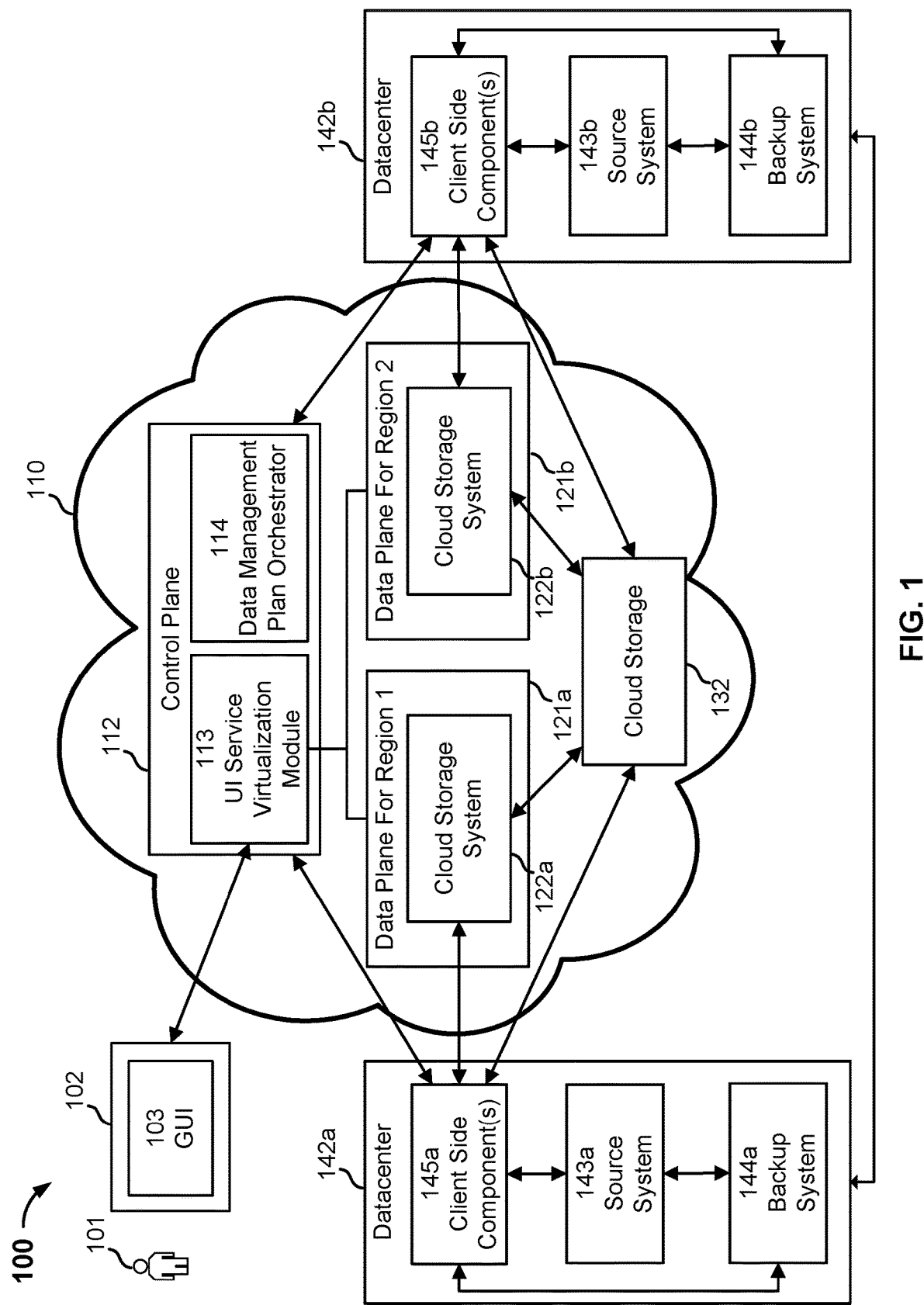
FIG. 1 is a block diagram illustrating a system for automatically implementing a specification of a data protection intent in accordance with some embodiments.

A technique to automatically implement a specification of a data protection intent is disclosed herein. The technique described herein provides a flexible approach to configure a data management service without having to explicitly identify, e.g., by name, the one or more objects to which the data management service applies. The data protection intent specification includes a data pool and one or more data management services that apply to the data pool.

A data pool may be comprised of one or more data sets. A data set is comprised of one or more objects. In some embodiments, a data pool is comprised of one or more objects without one or more specified data sets. Examples of objects include files, databases, virtual machine, applications, containers, volumes, etc. An object associated with the entity may be associated with one or more tags, labels, features, and/or prefixes (e.g., a naming convention). A tag, label, feature, or prefix may correspond to a file type, file extension, data type, location, storage tenant, creation date, file size, memory used, most recently update timestamp, permission level, owner, projection job type, etc. The one or more objects that are to be included in the data pool when the one or more data management services are performed may be based on a tag, label, feature, and/or prefix associated with the one or more objects. For example, the user associated with the entity may specify that objects having a tag "Mission Critical Billing" are to be included in the data pool. The data pool may be a heterogeneous data pool that includes objects of different type. For example, the data pool may include a virtual machine and a database.

The one or more objects included in the data pool may change over time. Objects may be added or removed from a data pool. For example, a first set of objects may be included in the data pool when a first instance of a first management service is performed. The first management service may be performed for one or more objects having a first tag. After the first management service is performed, the first tag may be removed from one or more objects included in the first set of objects. A second set of objects may be included in the data pool when a second instance of the first management service is performed. The second set of objects may include the one or more objects that were included in the first set of objects that still have the first tag, but exclude the one or more objects that were included in the first set objects, but no longer have the first tag.

The data protection intent specification may at least specify a recovery point objective (RPO), a recovery time objective (RTO), and/or an input/output operations per second (IOPS) value for the one or more objects to be included in the data pool. RPO is a measure of the acceptable amount of data loss for the one or more objects included in the data pool after a disruption of the one or more systems hosting the one or more objects included in the data pool. RTO is a measure of how fast the one or more objects included in the data pool need to be back online after the disruption. The IOPS value may indicate the minimum performance needed for a system to which the one or more objects may be restored, replicated, migrated, etc.

A data management provider may establish a data management as a service (DMaaS) infrastructure in a cloud environment (e.g., public cloud, private cloud, hybrid cloud, etc.) provided by a cloud provider (e.g., Amazon Web Services™, Microsoft™ Azure, Google Cloud™, etc.). The DMaaS infrastructure may enable entities to remotely specify a data protection intent for the objects that are stored in one or more datacenters associated with the entity. A datacenter may be a physical datacenter, a virtual data center, or located in a cloud environment. The DMaaS infrastructure may include a control plane and one or more data planes. The control plane may include a data management plan orchestrator that is configured to receive the specification of the data protection intent from a graphical user interface (GUI) of a user device associated with a user. In response, the data management plan orchestrator establishes a data pipeline to achieve the intent by analyzing the received data protection intent specification to identify one or more data management services needed to achieve the intent specified by the user, determining configurations for the one or more identified data management services, validating the received data protection intent specification, and after validation, sending one or more commands to one or more data storage devices, one or more data services, and/or one or more data management service tools needed to implement the configurations of the one or more data management services. A determined configuration for a data management service may include settings, constraints, and/or parameters for a data storage service associated with the data management service, a data storage device associated with the data management service, and/or a data management service tool (e.g., a software tool that assists in performing a backup). A configuration for a data management service tool may include a start time, a duration that the data management service tool may be used, and a time window in which the data management service tool may be used.

For example, the data management plan orchestrator may receive a specification of a data protection intent that indicates a near-zero RPO (e.g., less than five minutes) and a near-zero RTO (e.g., less than 5 minutes) for the one or more objects to be included in a data pool. The data management plan orchestrator may identify a backup job and a replication job needed to achieve the near-zero RPO and the near-zero RTO. The data management plan orchestrator may determine configurations for the one or more data management services (e.g., protection jobs, sync-replication, hot-standby, etc.) needed to achieve the near-zero RPO and the near-zero RTO for the one or more objects to be included in the data pool. After the data management plan orchestrator determines configurations for the one or more data management services, the data management plan orchestrator may determine whether the one or more data management services are able to be implemented in a manner that corresponds to the determined configurations. For example, the data protection intent specification may indicate a near-zero RTO at a particular disaster recovery site, but the particular disaster recovery site is unable to provide a near-zero RTO for one or more reasons (e.g., site connectivity issues, disaster recovery site load, etc.). The disaster recovery site may be a physical data center, a virtual data center, a cloud-based data center, etc. In the event the data protection intent is unable or unlikely to be achieved due to actual, estimate, or forecasted resources and/or loads, the data management plan orchestrator may provide to a user associated with the entity via a GUI associated with a user device, a notification that indicates the data protection intent is unable or unlikely to be achieved. In the event the data protection intent is able to be achieved, the data management plan orchestrator may implement the data protection intent by sending one or more commands to one or more data storage devices, one or more data services, and/or one or more data management service tools needed to implement the determined configurations for the one or more data management services.

The data management plan orchestrator may determine a plurality of different configurations. For example, the data management plan orchestrator may determine that the intent may be achieved by backing up data from a source system to a backup system and then replicating the backed up data to a storage system at a first disaster recovery site and that the intent may also be achieved by backing up data from the source system to the backup system and replicating the backed up data to a storage system at a second disaster recovery site. In some embodiments, the data management plan orchestrator automatically selects an optimal configuration (e.g., using a machine learning model, a rules-based model, a heuristic model, etc.). In some embodiments, the data management plan orchestrator provides the plurality of different configurations to a user via the GUI of the user device and receives a selection of one of the different configurations.

In some embodiments, the data management plan orchestrator analyzes the data protection intent specification and determines that the data protection intent may be implemented in a different manner than specified by the data protection intent specification. The data management plan orchestrator may determine a more efficient manner to achieve the data protection intent. For example, the data protection intent specification may include a disaster recovery plan that indicates a disaster recovery plan for VMs having a particular tag that are located at a primary site. The data protection intent specification may indicate a particular RPO and a particular RTO for the VMS having the particular tag, and a particular disaster recovery site. A hot standby is a replica of an object associated with the source system that is up-to date and ready to use within the specified RTO. The data management plan orchestrator may determine that creating, at the disaster recovery site, hot standbys for some or all of the one or more objects to be included in the data pool may achieve the data protection intent, however, the data management plan orchestrator may also determine that the particular RPO and the particular RPO may also be achieved by creating at a second disaster recovery site hot standbys for some or all of the one or more objects to be included in the data pool. This may be more efficient because less resources are used to configure the plurality of different data management services needed to achieve the data protection intent. For example, the amount of resources (e.g., primary system backup system processing resources, bandwidth resources to stream object data from the primary site backup system to the second disaster recovery site backup system, second disaster recovery site backup system processing resources, etc.) needed to create at a backup system located at the second disaster recovery site hot standbys for some or all of the one or more objects included in the data pool is less than the amount of resources (e.g., primary system backup system processing resources, bandwidth resources to stream object data from the primary site backup system to the disaster recovery site backup system, disaster recovery site backup system processing resources, etc.) needed to create at a backup system located at the disaster recovery site hot standbys for some or all of the one or more objects included in the data pool. The data management plan orchestrator may establish this hot-standby configuration even though it may not be required by the data protection intent specification because it reduces overall system resources needed to setup and achieve the disaster recovery plan specified by the data protection intent specification.

In some embodiments, the data management plan orchestrator monitors the one or more data storage devices, one or more data services, and/or one or more data management service tools performing the one or more data management services. The data plan management orchestrator may determine that a current configuration of the one or more data storage devices, one or more data services, and/or one or more data management service tools performing the one or more data management services to achieve the data protection intent need to be modified to maintain the data protection intent. For example, a data pool may include a plurality of VMS that are associated with a particular tag. The number of VMs associated with the particular tag may have increased since the current configuration was implemented such that a RPO and/or a RTO specified by the data protection intent specification cannot be achieved or maintained. The data management plan orchestrator may modify the current configuration in a manner that allows the data protection intent to be maintained. For example, the disaster recovery site identified in the data protection intent specification may be unable to provide a RPO and/or RTO specified by the data protection intent specification. The data management plan orchestrator may identify a different disaster recovery site for the primary site and configure the different disaster recovery site to achieve the data protection intent. The data management plan orchestrator may send to the different disaster recovery site one or more commands to establish one or more data management services at the different disaster recovery site. This ensures that regardless of changes to environment, the data management provider is able to provide an entity a level of protection specified by the data protection intent.

FIG. 1 is a block diagram illustrating a system for automatically implementing a specification of a data protection intent in accordance with some embodiments. In the example shown, system 100 enables user 101 to establish, via a GUI 103 of user device 102, a specification of a data protection intent for one or more datacenters.

User device 102 may be a computer, a desktop, a laptop, a smartphone, a tablet, or any other computing device with a GUI. User device 102 is associated with user 101. User 101 may be associated with an entity, such as an individual, an enterprise, a government, a company, an institution, an organization, etc. The entity may store a plurality of objects in datacenters 142a, 142b. An object may correspond to a file, a database, a virtual machine, an application, a volume, etc. Although FIG. 1 depicts the entity being associated with two datacenters, an entity may be associated with one or more datacenters. A datacenter may be a physical datacenter, a virtual data center, or located in a cloud environment.

A data management provider may establish a DMaaS infrastructure in cloud environment 110 (e.g., public cloud, private cloud, hybrid cloud, etc.) provided by a cloud provider (e.g., Amazon Web Services™, Microsoft™ Azure, Google Cloud™, etc.). The DMaaS infrastructure may enable entities to remotely specify a data protection intent for their data that is stored in one or more datacenters. The DMaaS infrastructure may include control plane 112 and one or more data planes, such as data planes 121a, 121b.

Control plane 112 is configured to manage the DMaaS infrastructure that enables users, such as user 101, to remotely access and manage one or more objects associated with an entity. Control plane 112 includes a user interface (UI) service virtualization module 113 that enables user device 102 to communicate with the DMaaS infrastructure. UI service virtualization module 113 may receive from device 102 via GUI 103 an indication of a specification of a data protection intent. The data protection intent may specify a data pool and a data management service to apply to the specified data pool. A data pool may be comprised of one or more data sets. A data set is comprised of one or more objects. In some embodiments, a data pool is comprised of one or more objects without one or more specified data sets. Examples of objects include files, databases, virtual machine, applications, containers, volumes, etc. An object associated with the entity may be associated with one or more tags, labels, features, and/or prefixes. A tag, label, feature, or prefix may correspond to a file type, file extension, data type, location, storage tenant, creation date, file size, memory used, most recently update timestamp, permission level, owner, projection job type, etc. The one or more objects that are to be included in the data pool when the one or more data management services are performed may be based on a tag, label, feature, and/or prefix associated with the one or more objects.

In response to receiving the data protection intent specification, UI service virtualization module 113 may provide the data protection intent specification to data management plan orchestrator 114. The data pool specification and the data management service specification represent an intent of user 101.

Data management plan orchestrator 114 may utilize the data protection intent that includes the data pool specification and the data management service specification to achieve the intent of user 101. For example, the data pool specified by user 101 via GUI 103 may indicate that virtual machines having a particular tag at a particular location need a particular RPO and a particular RTO. Data management plan orchestrator 114 may validate the data protection intent specification to determine whether the intent of user 101 is able to be achieved. Data management plan orchestrator 114 may validate the data protection intent specification by performing at least one of determining whether the inputs associated with the data protection intent are correct (e.g., whether inputs associated with a data management plan for a data management service are correct), determining the network resources needed to implement the data protection intent specification are sufficient, determining whether a specified resource (e.g., disaster recovery site system) needed to perform some or all of a data management plan of the data protection intent specification is capable of performing as required by the specified data management plan of the data protection intent specification (e.g., has enough storage, system resources, etc.), determining whether a service level agreement is able to be achieved (e.g., able to achieve a specified RPO and/or RTO), identifying the one or more datacenter components that are needed to achieve the intent, etc.

In the event the data protection intent specification is unable or unlikely to be achieved due to actual, estimate, or forecasted resources and/or loads, data management plan orchestrator 114 may notify, via GUI 103 of device 102, user 101 that the data protection intent specification is unable to be validated. Data management plan orchestrator 114 may implement one or more machine learning models to determine whether the data protection intent specification is unable or unlikely to be achieved. In the event the data protection intent specification of user 101 is able to be achieved, data management plan orchestrator 114 may orchestrate a plurality of different data management services in an attempt to achieve the specified data protection intent. The plurality of different data management services may include protection jobs (e.g., backup, continuous data protection), cloud archive, cloud conversion, cloud archive direct, sync-replication, hot-standby, etc. Data management plan orchestrator 114 may establish a data pipeline to achieve the intent by determining configurations for one or more data management services needed to achieve the intent specified by the user. A determined configuration for a data management service may include settings, constraints, and/or parameters for a data storage service associated with the data management service, a data storage device associated with the data management service, and/or a data management service tool (e.g., a software tool that assists in performing a backup). Data management plan orchestrator 114 may send one or more commands to the one or more data storage devices, one or more data services, and/or one or more data management service tools needed to implement the determined configurations of the one or more data management services. For example, data management plan orchestrator 114 may send one or more commands to client side components 145a, 145b, source systems 143a, 143b, backup systems 144a, 144b, cloud storage systems 122a, 122b, and/or cloud storage 132. In some embodiments, data management plan orchestrator 114 implements one or more machine learning models to determine the configurations. The one or more machine learning models may be a supervised model (e.g., linear regression, random forest, gradient boosting, support vector machine, logistic regression, artificial neural networks, convolutional neural networks, etc.), an unsupervised model (e.g., cluster analysis, k-means, DBSCAN (density-based spatial clustering of applications with noise), hierarchical clustering, anomaly detection, autoencoders, deep belief network, principal component analysis, etc.) a reinforcement model, etc.

Control plane 112 may establish one or more data planes for an entity based on a location of the entity's datacenters. For example, datacenter 142a may be located at a first location (e.g., California) and datacenter 142b may be located at a second location (e.g., New York). The data management provider may establish data plane 121a for a first region (e.g., "West Coast") that includes the first location and data plane 121b for a second region (e.g., "East Coast") that includes the second location. A data plane may include one or more cloud storage systems that are each comprised of one or more cloud servers (e.g., EC2 instances). A data plane may be configured to control how data associated with an entity is stored in cloud storage system 122a, cloud storage system 122b, and/or cloud storage 132.

An entity may add one or more additional datacenters at corresponding locations and the one or more additional datacenters may be assigned to a data plane based on the corresponding locations of the one or more additional datacenters. For example, an entity may add an additional datacenter at a third location (e.g., Los Angeles or Washington D.C.) and the additional datacenter may be assigned to data plane 121a or data plane 121b based on the third location (e.g., Los Angeles is located on the "West Coast," Washington D.C. is located on the "East Coast"). The data management provider may also add additional data planes in the event datacenters associated with an entity expand across the world (e.g., Europe, Asia, etc.).

Datacenters 142a, 142b include corresponding source systems 143a, 143b. A source system may be a server, a virtual machine, a container, a database, etc. In some embodiments, a source system is coupled to a backup system. For example, source system 143a may be coupled to backup system 144a and source system 143b may be coupled to backup system 144b. In some embodiments, a datacenter does not include a backup system. Source systems 143a, 143b may be configured to receive from control plane 112 one or more commands to perform one or more data management services. For example, source systems 143a, 143b may receive one or more commands to create a protection job for one or more objects hosted on source systems 143a, 143b, respectively. A protection job may be a full backup, an incremental backup, CDP, etc. An example of CDP is described in U.S. patent application Ser. No. 16/549,719 entitled "Continuous Data Protection Using A Write Filter," filed on Aug. 23, 2019, the entire contents of which are incorporated herein by reference for all purposes. CDP may be achieved by a source system, such as source systems 143a, 143b performing a reference snapshot to a backup system, such as backup system 144a, 144b. The source system may provide a log of write IOs that occur between reference snapshots. This allows the backup system to restore a source system to any point in time for which there is a backup snapshot and a write IO entry in a log.

The type of protection job created by source systems 143a, 143b may be based on the data protection intent. For example, the data protection intent may specify an RPO. If the specified RPO is less than or equal to a first threshold duration (e.g., 5 minutes), then the protection job may require CDP to be enabled for the one or more objects hosted by a source system that are included in the data pool. If the specified RPO is greater than the first threshold duration, then the protection job may require incremental backups of the one or more objects hosted by a source system to be performed according to a backup schedule (e.g., every hour, after a threshold amount of data has changed, etc.). The frequency at which an incremental backup is performed depends on the specified RPO and the capabilities of the source system to achieve the specified RPO.

Backup systems 144a, 144b may receive from control plane 112 one or more commands to perform one or more data management services for one or more objects to be included in a data pool when one or more data management services are to be performed. The plurality of different data management services may include backup, continuous data protection, sync-replication, cloud archive, cloud conversion, cloud archive direct, hot-standby, etc. For example, a backup system may receive one or more commands to backup data associated with one or more objects that are to be included in the data pool when the one or more data management services are to be performed. A backup system may receive one or more commands to perform a sync-replication operation to a destination system for objects to be included in the data pool that are to be backed up from a source system to the backup system. Sync-replication is the process of synchronously replicating data that is backed up data from the backup system to a destination system, such as a disaster recovery site. The destination system may be specified by the data protection intent specification. In some embodiments, the destination system is another backup system, such as backup systems 144a, 144b. In some embodiments, the destination system is a cloud storage, such as cloud storage 132. A hot standby may be generated at any of the destination systems.

A backup system may receive one or more commands to generate corresponding hot-standbys for one or more objects included in a data pool. A hot standby may be a replica of an object associated with the source system that is up-to date and ready to use within a specified RTO. Data management plan orchestrator 114 may determine whether hot-standbys are needed for the one or more objects to be included in the data pool when the one or more data management services are to be performed based on a specified RTO included in a data protection intent specification. If the RTO is less than or equal to a second threshold duration (e.g., 5 minutes), data management plan orchestrator 114 may require a hot standby be created for some or all of the one or more objects to be included in the data pool when the one or more data management services are to be performed. If the RTO is greater than the second threshold duration, data management plan orchestrator 114 may not require a hot standby to be created for some or all of the one or more objects to be included in the data pool when the one or more data management services are to be performed.

Datacenters 142a, 142b may include corresponding client side component(s) 145a, 145b. The one or more client side components 145a, 145b may be configured to receive from control plane 112 one or more commands to perform one or more data management services. For example, the one or more client side components 145a, 145b may receive one or more commands to back up content from corresponding source systems 103a, 103b and/or corresponding backup systems 104a, 104b to cloud storage 132 (e.g., Amazon Simple Storage Service (S3)). Client side components 145a, 145b may receive one or more commands to replicate objects having a particular tag to datacenter 142b, 142a, respectively. Client side components 145a, 145b may receive one or more commands to cause an object having a particular tag that is hosted on source systems 143a, 143b, respectively, to have a particular RPO and RTO.

A client side component, such as client side components 105a, 105b, may backup to cloud storage 132 data associated with a source system, such as source systems 103a, 103b, or data associated with a backup system, such as backup systems 104a, 104b. A cloud storage system, such as cloud storage systems 122a, 122b, may generate metadata for the data that is stored at cloud storage 132. In some embodiments, a cloud storage system, such as cloud storage system 122a, 122b, may store the generated metadata at cloud storage 132.

User 101 may specify a data protection intent via GUI 103 of user device 102. In some embodiments, GUI 103 is part of an application running on user device 102. In some embodiments, GUI 103 is a plugin running in a web browser. In some embodiments, GUI 103 is provided by a containerized-application running on user device 102. GUI 103 is configured to present a plurality of building blocks that enable user 103 to specify the data protection intent. GUI 103 may enable user 101 to manipulate the plurality of building blocks in manner that graphically represents the user's data protection intent.

A data pool may include one or more data sets. A data set is comprised of one or more objects. In some embodiments a data pool is comprised of one or more objects without one or more data sets. GUI 103 may enable user 101 to graphically specify which objects are to be included in the data pool and/or a data set through the use of one or more of the building blocks. For example, GUI 103 may display a plurality of building blocks for specifying a data set. GUI 103 may enable user 101 to perform a series of "drag and drop" operations of the plurality of building blocks to specify the data set. A data set specified by user 101 may include any combination of the building blocks available for specifying a data set. GUI 103 may enable the data set specified by user 101 to be included in a data pool specified by user 101.

The plurality of building blocks for specifying a data set may include a GUI item that enables user 101 to specify a data set to be included in a data pool. The GUI item may enable user 101 to name the data set.

The plurality of building blocks for specifying a data set may include a GUI item that enables user 101 to specify a location associated with objects to be included in the data set. Objects that are not associated with the specified location may be excluded from the data set.

The plurality of building blocks for specifying a data set may include a GUI item that enables user 101 to specify a data source for objects to be included in the data set. The objects that are included in the data set may be limited based on a data type associated with object. For example, the data set may be limited to VMs and exclude objects of other data types (e.g., databases).

The plurality of building blocks for specifying a data set may include a GUI item that enables user 101 to manually select objects to be included in the data set. The GUI provides a flexible approach to add one or more objects to a data set without having to explicitly identify, (e.g., by name), the one or more objects to be included in the data set. However, the GUI provides a user the ability to include one or more objects by name.

The plurality of building blocks for specifying a data set may include a GUI item that enables user 101 to specify objects to be included in the data set by a tag, a label, feature, and/or a prefix. For example, user 101 may specify that objects with a tag are included in the dataset.

The plurality of building blocks for specifying a data set may include a GUI item that enables user 101 to specify a rule for adding objects to the data set. For example, user 101 may specify a rule that objects included in the data set may not be transmitted outside a particular region. A disaster recovery plan may be established for a datacenter located in the United Kingdom. An entity may have a datacenter located in New York and Germany. The rule may indicate that objects located in the dataset may not be transmitted outside of Europe. Thus, the datacenter located in Germany may be selected as a disaster recovery site while the data center located in New York may not be selected as a disaster recovery site. In another example, user 101 may specify a rule that VMs having certain criteria or properties (e.g., memory used is greater than a first threshold) are to be included in the data set. In the event a new VM is created and has the certain criteria or properties specified by the rule (e.g., the new VM uses more memory than the first threshold), the new VM may be automatically added to the data set.

The plurality of building blocks for specifying a data set may include a GUI item that enables user 101 to add a rule operator for the data set. For example, user 101 may specify that objects created before a particular date are excluded from the data set.

After a data set has been finalized (e.g., saved), the data set may be available for selection to specify a data pool. GUI 103 may enable user 101 to specify which data sets to include in a data pool for a specification of a data protection intent. A data protection intent specification is comprised of a specified data pool and one or more data management services.

GUI 103 may enable user 101 to specify a data protection intent through the use of a plurality of building blocks. GUI 103 may enable user 101 to perform a series of "drag and drop" operations to specify the data protection intent. The data protection intent specified by user 101 may include any combination of the building blocks available for specifying the data protection intent.

The plurality of building blocks may include a GUI item that enables user 101 to specify a primary site associated with a disaster recovery plan. A primary site may correspond to a datacenter location associated with an entity.

The plurality of building blocks may include a GUI item that enables user 101 to specify, if needed, a disaster recovery site associated with the disaster recovery plan. The disaster recovery site may correspond to a datacenter associated with the entity that is different than the specified primary site.

The plurality of building blocks may include a GUI item that enables user 101 to specify a data pool to which the disaster recovery plan is to be applied. The data pool is comprised of one or more data sets. In the event user 101 adds a plurality of data sets to the data pool, the order in which the disaster recovery plan is to be applied is based on a top-down order. In some embodiments, the order in which the disaster recovery plan is to be applied is based on a bottom-up order. In some embodiments, the one or more data sets are analyzed to determine all of the objects included in the one or more data sets and the data management service is applied to the objects included in the one or more data sets independent of the object's membership in a data set.

The plurality of building blocks may include a GUI item that enables user 101 to specify a target center associated with the disaster recovery plan. In some embodiments, a target center corresponds to a data set. In some embodiments, the target center corresponds to a server or virtual machine that is to receive data associated with one or more objects stored at the primary site. For example, the target center may correspond to a server or virtual machine that is to be used for restore, migration, replication, continuous data protection, etc.

The plurality of building blocks may include a GUI item that enables user 101 to specify a time delay associated with the disaster recovery plan. The time delay may indicate an amount of time after the data protection intent specification is validated before a data management service associated with the data protection intent specification is performed.

In some embodiments, a time delay is specified for a data set included in a data pool. For example, a data management service may be applied to a first data set included in the data pool. The graphical user interface item that enables a user to specify a time delay associated with the data management service may enable the user to specify an amount of time before the data management service is applied to a second data set included in the data pool.

In some embodiments, a time delay is applied to a data pool. For example, after a specification of the data protection intent is validated, the time delay may indicate an amount of time before one of the data management services included in the data protection intent specification is to be applied to the data pool.

The plurality of building blocks may include a GUI item that enables user 101 to specify a script associated with the disaster recovery plan. For example, the script may be a script to validate that a target center has enough storage to perform the data management service, a script to check network connectivity to perform the data management service, etc.

The plurality of building blocks may include a GUI item that enables user 101 to specify a protection profile associated with the disaster recovery plan. The protection profile may indicate a RTO, a RPO, and/or IOPS associated with objects included in the specified data pool. The protection profile may indicate a tier associated with objects included in the specified data pool. A tier may be associated with a corresponding RPO, RTO, and/or IOPS.

The protection profile may indicate a frequency at which backups (e.g., continuous, hourly, daily, weekly, etc.) are to be performed for objects included in the specified data pool. The protection profile may indicate a type of backup (e.g., full backup, incremental backup, CDP) that is to be performed for objects included in the specified data pool. The protection profile may indicate a frequency (e.g., one time, daily, weekly, etc.) at which a virus scan is performed on objects included in the specified data pool. The protection profile may indicate an object tier for objects included in the specified data pool. Objects having different object tiers may be associated with different protection profiles.

GUI 103 may include a GUI item that enables user 101 to validate the combination of building blocks that specify the data protection intent. In response to a selection of the GUI item, user device 102 may send to control plane 112 data associated with the data protection intent specification. The data protection intent specification may include data associated with a specified data management plan (e.g., disaster recovery plan) for a data management service. The data associated with the data protection intent specification is provided to data management plan orchestrator 114.

Figure 2:
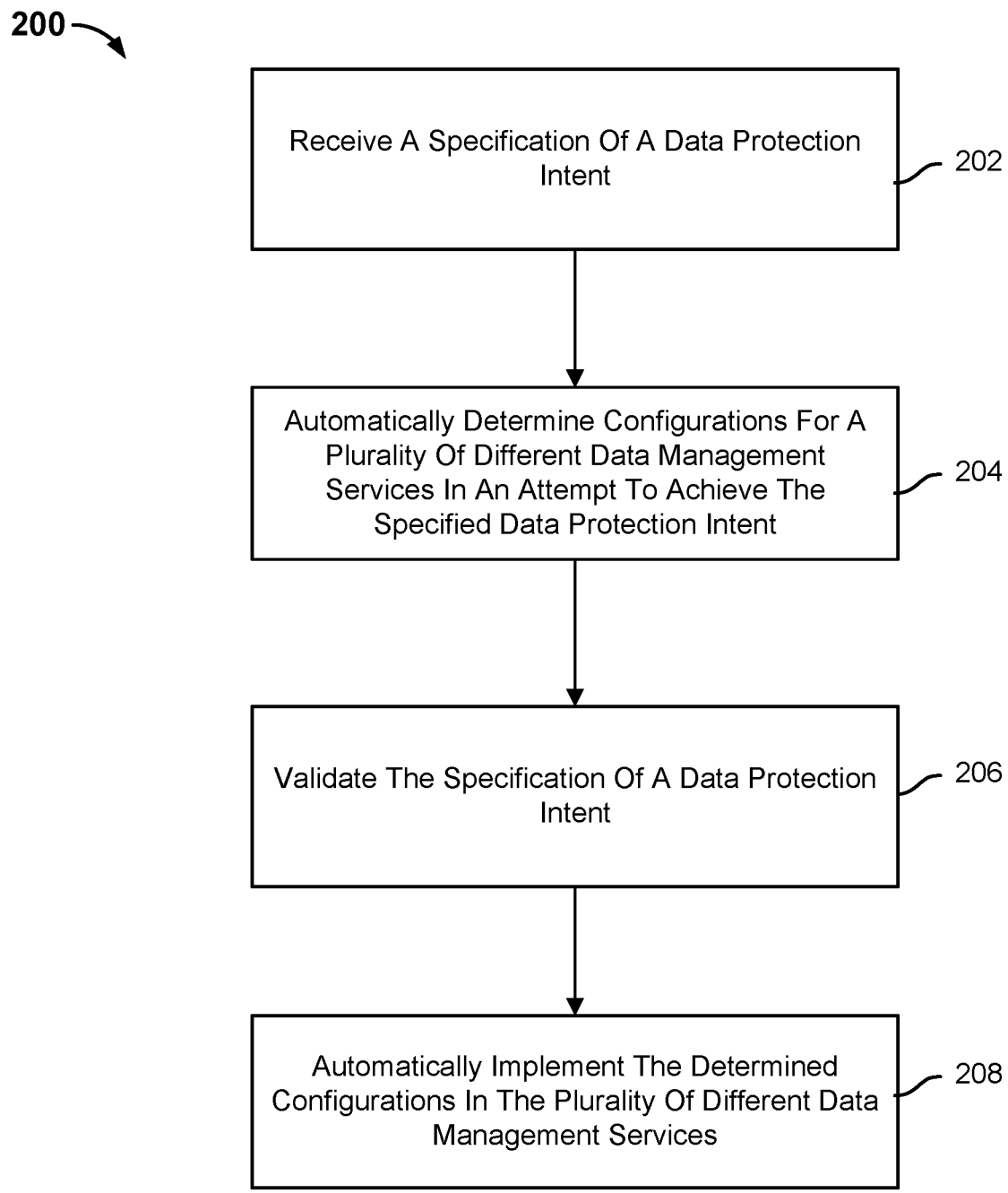
FIG. 2 is a flow diagram illustrating a process for implementing a specification of a data protection intent in accordance with some embodiments.

FIG. 2 is a flow diagram illustrating a process for implementing a specification of a data protection intent in accordance with some embodiments. In the example shown, process 200 may be implemented by a data protection management orchestrator, such as data management plan orchestrator 114.

At 202, a specification of a data protection intent is received. The specification indicates a data pool and one or more data management services that are to be applied to the one or more objects associated with the data pool. In some embodiments, the one or more objects to be included in the data pool when the data management service is performed share at least one tag, label, feature, and/or prefix. For example, the data pool may include 50 VMS that are associated with the shared tag, label, feature, and/or prefix. In some embodiments, the data protection intent specification indicates, for the one or more objects included in the data pool, a RPO, a RTO, and/or an IOPS.

The data protection intent specification may indicate a primary site associated with the one or more objects included in the data pool. The data protection intent specification may indicate one or more disaster recovery sites. For example, the data protection intent specification may indicate the primary site is located in San Jose, California, a first disaster recovery site is located in Nevada and a second disaster recovery site is located in a cloud storage (e.g., Amazon Web Services®). The first disaster recovery site may include a backup system. The data protection intent specification may indicate that the one or more objects included in the data pool are to be available at the backup system of the first disaster recovery site with a near-zero RPO (e.g., less than 5 minutes) and a near-zero RTO (e.g., less than 5 minutes). The data protection intent specification may indicate that the one or more objects included in the data pool are to be available at the cloud storage of the second disaster recovery site with a near-zero RPO and an RTO of 8 hours.

In some embodiments, the data protection intent specification indicates a tier associated with the one or more objects included in the data pool. The tier may have an associated RPO and/or RTO requirement. For example, tier 1 objects may be associated with a near-zero RPO and a near-zero RTO, tier 2 objects may be associated with a RPO of a first value and a RTO of a first value, . . . , and tier n objects may be associated with a RPO of an nth value and a RTO of a nth value.

At 204, configurations for a plurality of different data management services in an attempt to achieve the specified data protection intent are automatically determined. A data management provider may provide a plurality of different data management services. The data management plan orchestrator may determine which of the plurality of different data management services are needed to implement the specified data protection intent. The data management plan orchestrator may also determine a corresponding configuration for each of the determined data management services needed to implement the specified data protection intent.

For example, to make the one or more objects included in the data pool available at the first disaster recovery site with a near-zero RPO and a near-zero RTO, the data management plan orchestrator may need to determine a backup system associated with the primary site, determine protection job configurations for the one or more objects included in the data pool at the primary site, determine sync-replication configuration between a backup system of the primary site and a backup system of the first disaster recovery site, and determine hot-standby configurations for the one or more objects at the first disaster recovery site.

Data management services may be different based on the type of service (e.g. backup, restore, disaster recovery, replication, migration, analytics, compliance, security, etc), configuration (e.g. configuring a backup for a VM may be different from configuring a backup for a DB), tools required (backing up a VM may require backing up a DB), or combinations thereof.

Different configurations of a data management service may be needed for different types of objects. For example, the configuration of a database backup may be different than the configuration of a virtual machine backup. In some embodiments, the configurations of a data management service is the same for different types of objects.

Different data management service tools may be needed based on the type of object to which the data management service is being performed. For example, the one or more data management service tools for performing a database backup may be different than the one or more data management service tools for performing a virtual machine backup. In some embodiments, the data management service tools(s) are the same for different types of objects.

The configurations for one or more data management service tools associated with performing a data management service may also be different based on the object to which the data management service is being performed. For example, the configuration of one or more data management service tools for performing a database backup may be different than the configuration of one or more data management service tools for performing a virtual machine backup. In some embodiments, the configurations for one or more data management service tools associated with performing a data management service is the same for different types of objects.

The data management plan orchestrator may use a data structure (e.g., table, list, etc.) to determine the backup system associated with the primary site. The data management plan orchestrator may determine the protection job configurations for the one or more objects included in the data pool at the primary site based on the data protection intent specification. The data protection intent specification may include a specified RPO. If the specified RPO is less than or equal to a first threshold duration (e.g., 5 minutes), then the protection job may require CDP to be enabled for the one or more objects at the primary site. If the specified RPO is greater than the first threshold duration, then the protection job may require incremental backups to be performed at the primary site according to a backup schedule (e.g., every hour, after a threshold amount of data has changed, etc.).

The data management plan orchestrator may determine sync-replication configurations between a backup system of the primary site and a backup system of the first disaster recovery site and hot-standby configurations for the one or more objects at the first disaster recovery site based on the data protection intent specification. The data protection intent specification may include a specified RTO. If the specified RTO is less than or equal to a second threshold duration (e.g., 5 minutes), the sync-replication configuration may require a hot standby to be created for some or all of the one or more objects included in the data pool. If the specified RTO is greater than the second threshold duration, the sync-replication configuration may not require a hot standby to be created for some or all of the one or more objects included in the data pool.

In another example, to make the one or more objects included in the data pool available at the cloud storage with a near-zero RPO, the data management plan orchestrator may need to determine a cloud archive direct configuration for the one or more objects at the second disaster recovery site. In the event the RPO is less than or equal to a third threshold duration, data associated with the one or more objects included in the data pool may need to be continuously streamed from a source system hosting the one or objects included in the data pool to a cloud storage. In the event the RPO is greater than equal to the third threshold duration, data associated with the one or more objects included in the data pool may need to be archived from a source system hosting the one or objects included in the data pool to a cloud storage according to a schedule that allows the specified RPO to be achieved. To make the one or more objects included in the data pool available at the cloud storage with a RTO of 8 hours, the data management plan orchestrator may need to determine a cloud format conversion process configuration needed to convert the data associated with the one or more objects included in the data pool that is stored at the cloud storage into a format associated with a cloud provider.

In some embodiments, a data management plan orchestrator may determine configurations for a plurality of different data management services based on a corresponding tier associated with the one or more objects included in the data pool.

At 206, the specification of the data protection intent is validated. The data management plan orchestrator may determine whether determined configurations are able to be achieved. In the event the determined configurations are not able to be achieved, the data management plan orchestrator may inform a user associated with an entity that the data protection intent specification is not validated.

At 208, the determined configurations in the plurality of different data management services are automatically implemented. The data management orchestrator may send one or more commands to the one or more data storage devices, one or more data services, and/or one or more data management service tools needed to implement the determined configurations of the one or more data management services.

Figure 3:
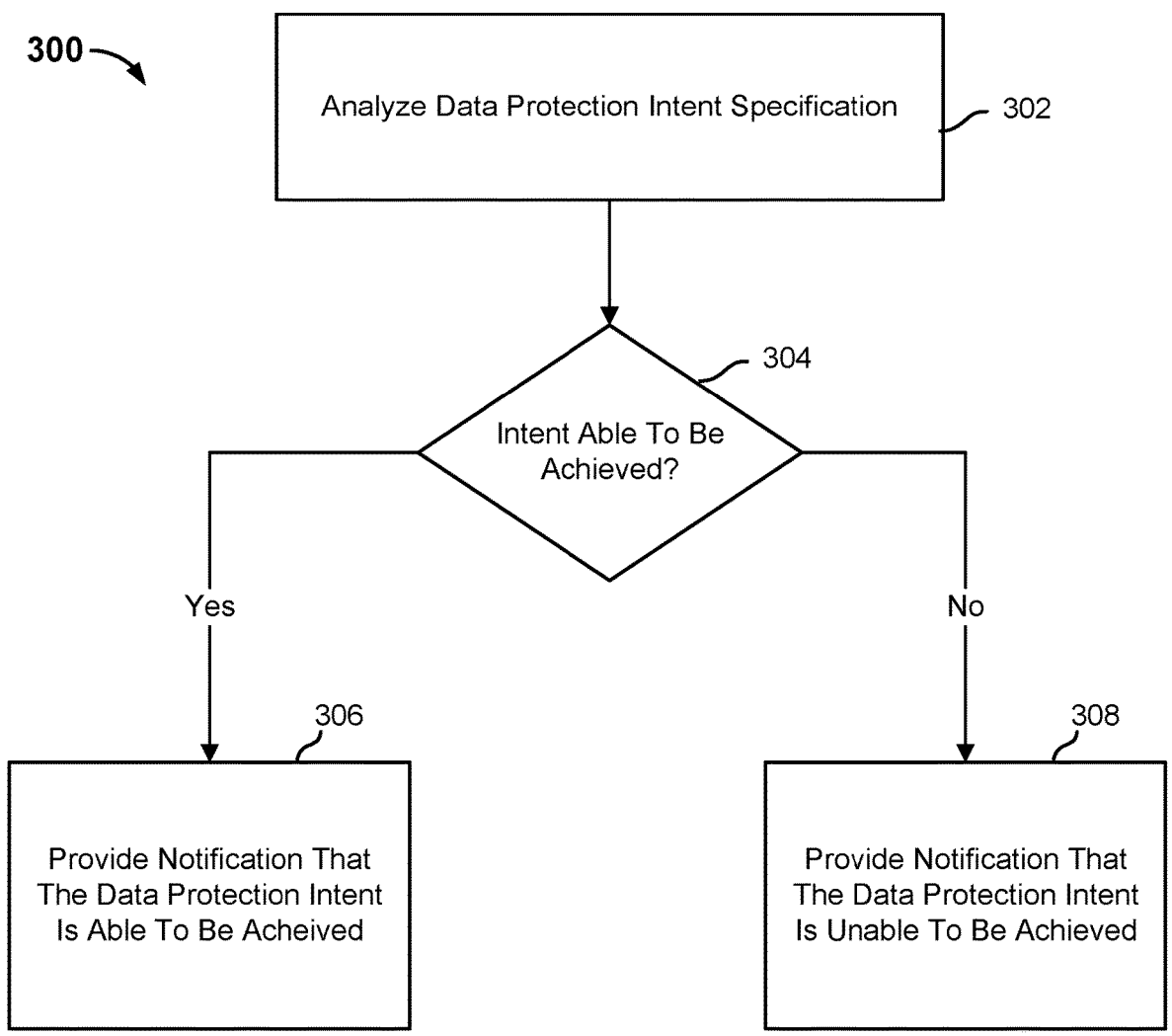
FIG. 3 is a flow diagram illustrating a process for validating a data protection intent in accordance with some embodiments.

FIG. 3 is a flow diagram illustrating a process for validating a data protection intent in accordance with some embodiments. In the example shown, process 300 may be implemented by a data management plan orchestrator, such as data management plan orchestrator 114. In some embodiments, process 300 is implemented to perform some or all of step 206 of process 200.

At 302, a specification of a data protection intent is analyzed. The specification may include a specified RPO, a specified RTO, a specified IOPS, etc. The data protection intent specification analysis may identify one or more types of objects specified to be included in the data pool when the disaster recovery plan is performed. For example, the data management plan orchestrator may identify, based on tags, labels, and/or features associated with a particular object, whether the particular object is a high input/output (IO) object (e.g., an object having a number of IOs/min greater than or equal to an IO threshold), whether the particular object is a low IO object (e.g., an object having a number of IOs/min less than or equal to the IO threshold), performance requirements associated with the particular object, etc.

A data management plan orchestrator may determine configurations for a plurality of different data management services needed to achieve the data protection intent specification.

At 304, it is determined whether the data protection intent is able to be achieved based in part on the data protection intent specification and the data protection intent specification analysis. A data management plan orchestrator may identify the one or more data storage devices, one or more data services, and/or one or more data management service tools needed to achieve the data protection intent specification. Each of the one or more identified data storage devices, data services, or data management service tools may need to perform some or all of a data management service. The one or more data management services may include protection jobs, sync-replication, and/or hot-standby. The data management plan orchestrator may determine whether an identified data storage device, an identified data service, and/or an identified data management service tool is able to implement a corresponding configuration associated with the one or more data management services that the identified data storage devices, identified data services, and/or data management service tools are to implement.

For example, the data management plan orchestrator may determine that a scheduled backup (e.g., every hour, every six hours, daily, etc.) is sufficient to achieve the specified RPO for an object. The data management plan orchestrator may determine whether a backup system has sufficient storage to store the data associated with the object to achieve the specified RPO for the object.

In some embodiments, the data management plan orchestrator determines that CDP needs to be enabled to achieve the specified RPO for an object. The data management plan orchestrator may determine whether the object is capable of performing CDP. The data management plan orchestrator may determine whether network capabilities are sufficient to support CDP.

The data management plan orchestrator may determine a sync-replication configuration for the one or more objects to be included in the data pool when a data management plan for a data management service is performed based on a specified RPO and a specified RTO included in the data protection intent specification, and the data protection intent specification analysis. If the specified RTO is less than or equal to an RTO threshold duration (e.g., 5 minutes), the sync-replication configuration may require a hot standby to be created for some or all of the one or more objects (e.g., the CDP-enabled objects) to be included in the data pool when the disaster recovery plan is performed. If the specified RTO is greater than the RTO threshold duration, the sync-replication configuration may not require a hot standby to be created for some or all of the one or more objects included in the data pool when the data management plan is performed. The data management plan orchestrator may determine whether a specified disaster recovery system is capable of hosting hot standbys as specified in the data protection intent. For example, the data protection intent analysis may determine that an object is a high IO and the specified disaster recovery system may not have sufficient resources to host a hot standby for the high IO object because it hosts other objects that already use a majority of the specified disaster recovery system's resources.

The determined sync-replication configuration may indicate a frequency at which write IOs stored in the log maintained by the CDP service are streamed to a hot standby based on the specified RPO. If the specified RPO is less than or equal to a RPO threshold duration (e.g., 5 minutes), the sync-replication configuration may require write IOs logged by the CDP service associated with the backup system to be streamed from the backup system to the hot standby as the write IOs are received by the CDP service associated with the backup system from the source system. If the specified RPO is greater than the RPO threshold duration, the sync-replication configuration may require write IOs logged by the CDP service associated with the backup system to be streamed from the backup system to the hot standby at a frequency that allows the specified RPO to be achieved (e.g., every 30 minutes, hourly, etc.). The data management plan orchestrator may determine whether the network resources are capable of supporting the specified RPO.

In the event the data protection intent is able to be achieved, process 300 proceeds to 306. The data protection intent specification may be validated in the event each of the one or more identified systems are able to implement the one or more corresponding data management services needed to achieve the data protection intent specification.

In the event the data protection intent is unable to be achieved, process 300 proceeds to 308. The data protection intent may be unachievable in the event at least one of the one or more identified systems is unable to perform the one or more corresponding data management services needed to achieve the data protection intent specification.

At 306, a notification that the data protection intent is able to be achieved is provided. The notification may be provided to a user associated with an entity via a GUI of a user device.

At 308, a notification that the data protection intent is unable to be achieved is provided. In some embodiments, the notification includes one or more recommendations to modify the data protection intent specification (e.g., modify disaster recovery site, modify specified RPO, modify specified RTO, etc.) that, if adopted by the user, would cause the data management plan orchestrator to validate the data protection intent specification. The user may accept the modified data protection intent specification. In response, the data management plan orchestrator may cause the modified data protection intent specification to be implemented.

In some embodiments, the notification indicates a closest possible data protection intent. For example, the user may have specified an RTO of 5 minutes for a data pool. The notification may indicate that an RTO of 5 minutes is not possible for the data pool, but an RTO of 10 minutes is possible. The user may accept the closest possible data protection intent specification. In response, the data management plan orchestrator may cause the closest possible data protection intent to be implemented.

Figure 4:
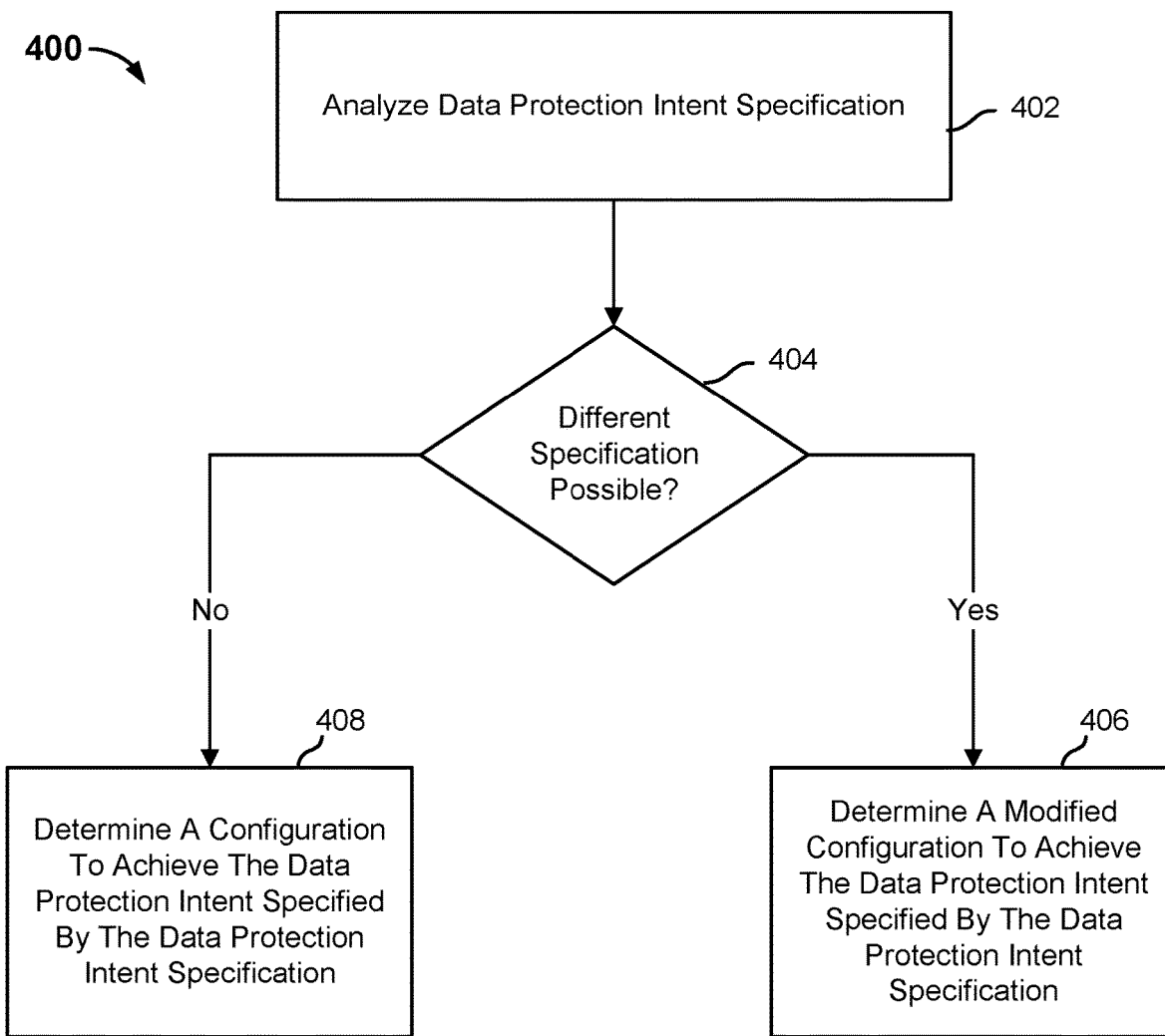
FIG. 4 is a flow diagram illustrating a process for improving a data protection intent in accordance with some embodiments.

FIG. 4 is a flow diagram illustrating a process for improving a data protection intent in accordance with some embodiments. In the example shown, process 400 may be implemented by a data management plan orchestrator, such as data management plan orchestrator 114. In some embodiments, process 400 is implemented to perform some or all of step 204 of process 200.

At 402, a specification of a data protection intent is analyzed. The data protection intent specification may indicate a disaster recovery plan that includes at least a particular RPO, a particular RTO, and/or a particular IOPS value. The disaster recovery plan may specify a particular primary site and a particular disaster recovery site.

At 404, it is determined whether a different specification is possible to achieve the data protection intent. A data management plan orchestrator may determine whether a different specification that still achieves the data protection intent, but reduces the number of resources needed to achieve the data protection intent can be implemented.

For example, the specification of the data protection intent may specify a near-zero RPO (e.g., less than 5 minutes), and to make the one or more objects included in a data pool available at a disaster recovery site with a near-zero RPO (less than 5 minutes) and a RTO of 30 minutes. The example described with respect to FIG. 2 required the data management plan orchestrator to configure for some or all of the one or more objects included in the data pool, a corresponding hot standby at the first data recovery site to achieve the near-zero RPO and the near-zero RTO requirements. In contrast, the data management plan orchestrator may determine an RTO of 30 minutes may be achieved without having to set up the hot standbys at the first disaster recovery site. Instead, the data management plan orchestrator may determine that an RTO of 30 minutes may be achieved by setting up at a backup system of a second disaster recover site corresponding hot standbys for some or all of the one or more objects to be included in the data pool when the disaster recovery plan is performed. This reduces the overall amount of resources (e.g., processing, network, time, etc.) needed to achieve the near-zero RPO and a 30 minute RTO specification.

The different specification may include replacing one of the different data management services with another data management service. E.g., a scheduled backup may be replaced with CDP protection.

In the event it is determined that a different specification is possible to achieve the data protection intent, process 400 proceeds 406. In the event it is determined that a different specification is not possible to achieve the data protection intent, process 400 proceeds 408.

At 406, a modified configuration to achieve the data protection intent specified by the data protection intent specification is determined. The data management plan orchestrator may determine which of the plurality of different data management services are needed to implement the modified specification of the data protection intent. The data management plan orchestrator may implement one or more machine learning models to determine the modified configuration. The data management plan orchestrator may also determine a corresponding configuration for each of the determined data management services needed to implement the modified specification of the data protection intent.

For example, instead of creating at the disaster recovery site a corresponding hot standby for some or all of the one or more objects to be included in the data pool when a disaster recovery plan is performed, a corresponding hot standby may be created at a backup system at the primary datacenter for some or all of the one or more objects to be included in the data pool when the disaster recovery plan is performed. The corresponding hot standbys for some or all of the one or more objects may be stored in a first storage tier (e.g., SSD) associated with the backup system at the primary site. The corresponding hot standbys may be pinned to the first storage tier associated with the backup system at the primary site.

At 408, a configuration to achieve the data protection intent specified by the data protection intent specification is determined. The data management plan orchestrator may determine configurations for each of the one or more different data management services needed to achieve the data protection intent.

Figure 5:
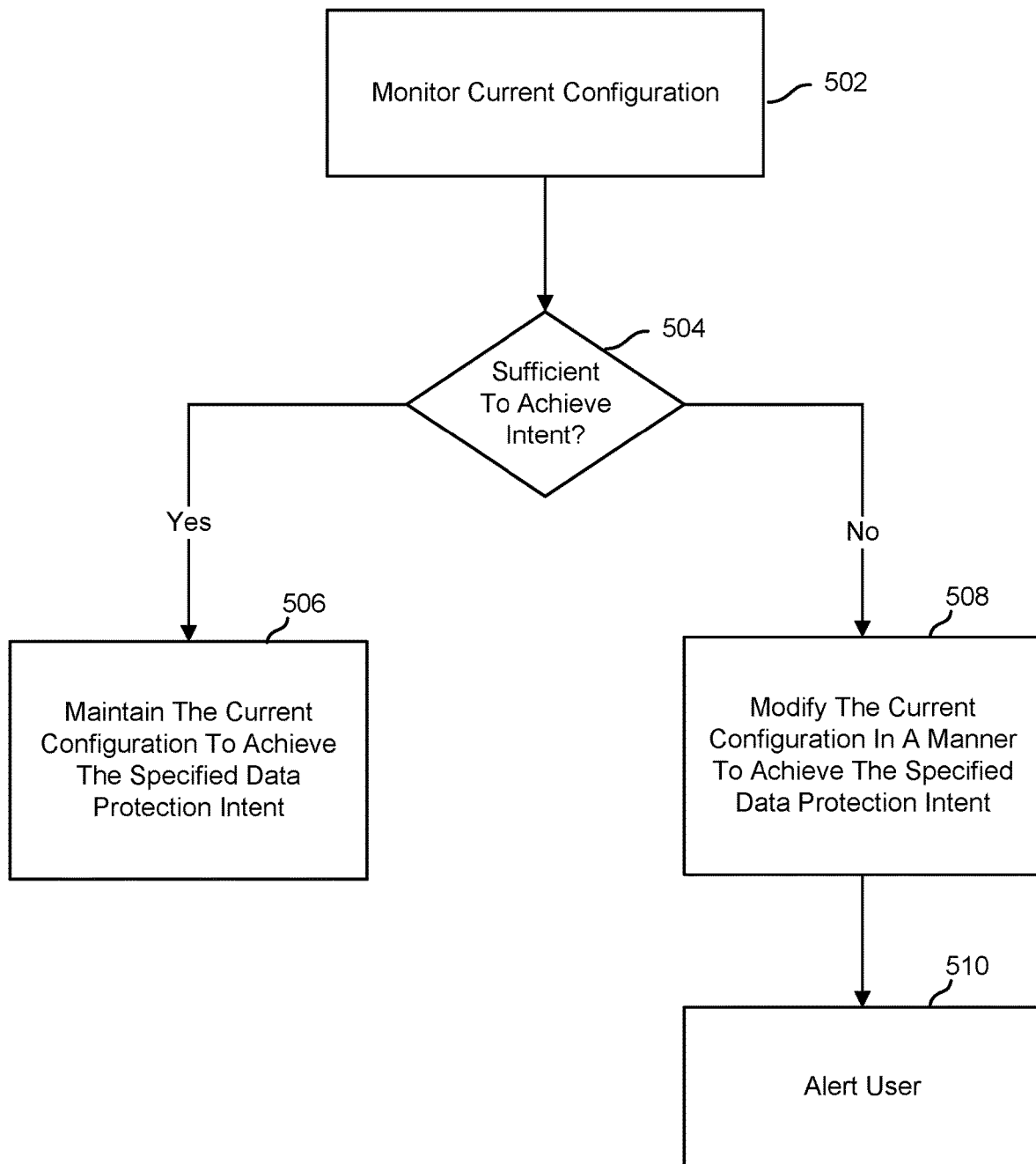
FIG. 5 is a flow diagram illustrating a process for updating a configuration to achieve a data protection intent in accordance with some embodiments.

FIG. 5 is a flow diagram illustrating a process for updating a configuration to achieve a data protection intent in accordance with some embodiments. In the example shown, process 500 may be implemented by a data management plan orchestrator, such as data management plan orchestrator 114. In some embodiments, process 500 is implemented to perform some of step 208 of process 200.

At 502, a current configuration of one or more data management services is monitored. The one or more data management services are configured in a manner to provide data protection for one or more objects included in a data pool. The one or more objects included in the pool may share the same tag, label, and/or prefix. The number of objects included in the pool may increase over time. As a result, the current configuration of the one or more data management services may be insufficient to maintain the data protection intent.

At 504, it is determined whether the current configuration is sufficient to achieve the data protection intent. For example, the number of VMs included in the data pool may have increased since the current configuration of the one or more data management services was initially implemented. As a result, the current configuration of the one or more data management services may be unable to maintain the data protection intent.

In some embodiments, the one or more storage devices, one or more data services, and/or one or more data management service tools running the one or more data management services may be insufficient to maintain the data protection intent. For example, a data storage device may run out or close to running out of storage for a CDP-enabled object. A primary site and a disaster recovery site may be experiencing connectivity issues that may cause a specified RPO and/or specified RTO associated with a data pool to be unachievable.

In the event the current configuration is sufficient to achieve the data protection intent, process 500 proceeds to 506 where the current configuration is maintained. In the event the current configuration is not sufficient to achieve the data protection intent, process 500 proceeds to 508.

At 508, the current configuration is modified in a manner to achieve the specified data protection intent. The data management plan orchestrator may determine which of the plurality of different data management services are needed to implement a modified configuration to achieve the specified data protection intent. The data management plan orchestrator may also determine a corresponding configuration for each of the determined data management services needed to implement the modified configuration of the data protection intent.

At 510, the user is alerted that the current configuration is modified. In some embodiments, step 510 occurs before step 508 and the user indicates how the current configuration should be modified to achieve the specified data protection intent.

Figure 6:
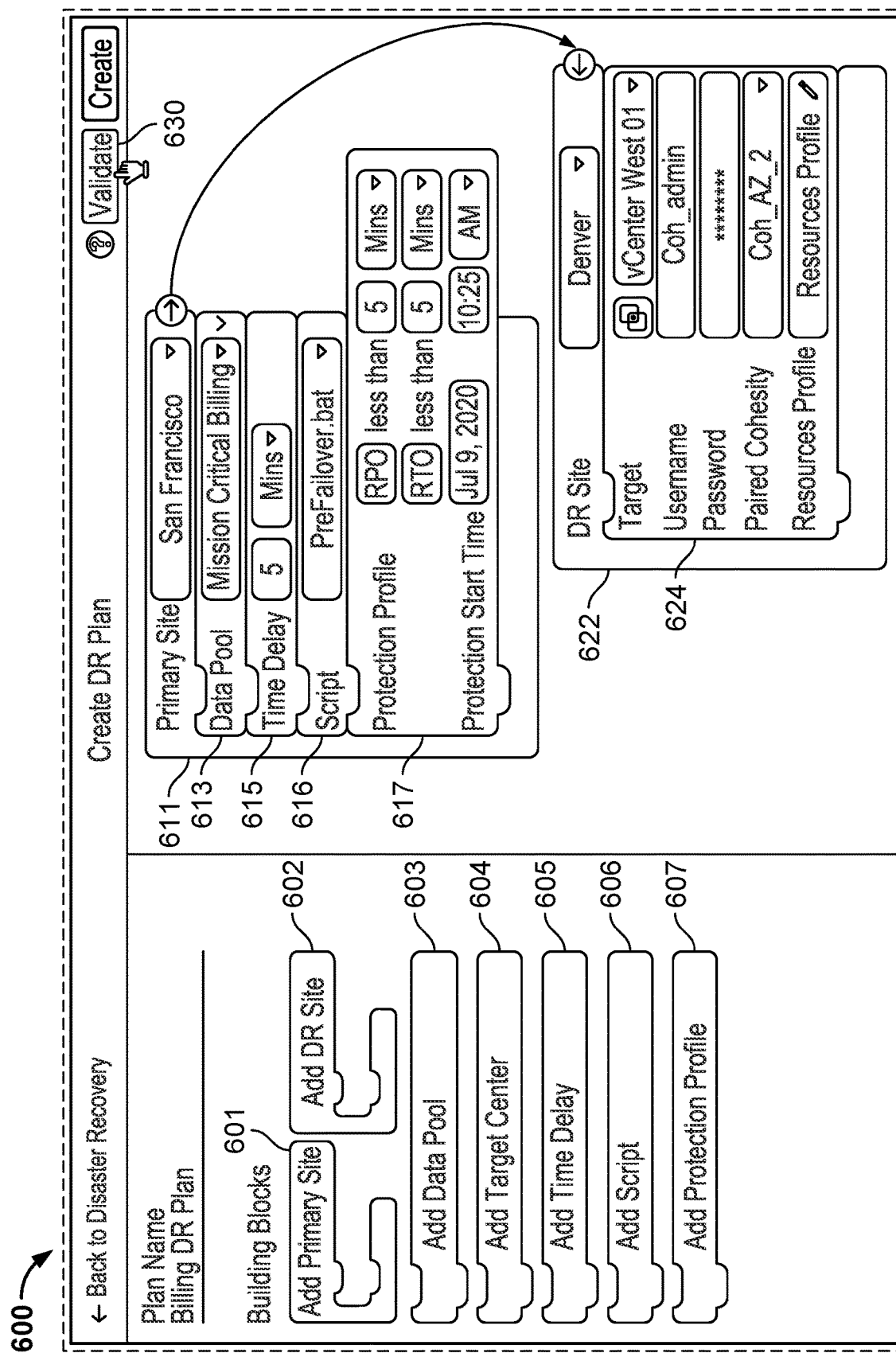
FIG. 6 illustrates an example of a graphical user interface in accordance with some embodiments.

FIG. 6 illustrates an example of a GUI in accordance with some embodiments. In the example shown, GUI 600 illustrates a specification of a data protection intent. The data protection intent specification may be specified by a user via a GUI, such as GUI 103.

GUI 600 is configured to present a plurality of building blocks that enable a user to specify a data protection intent. GUI 600 may enable a user to manipulate a plurality of building blocks in manner that graphically represents the user's data protection intent. One or more data blocks may be nested within one of the data blocks to indicate part of the data protection intent. In the example shown, a user has specified a disaster recovery plan for a disaster recovery service (e.g., data management service).

A data pool may include one or more data sets. A data set is comprised of one or more objects. In some embodiments, a data pool is comprised of one or more objects without one or more specified data sets. GUI 600 may enable a user to graphically specify which objects are to be included in the data set when the disaster recovery plan is performed through the use of one or more of the building blocks. For example, GUI 600 may display a plurality of building blocks for specifying a data protection intent. GUI 600 may enable a user to specify a data protection intent through the use of a plurality of building blocks. GUI 600 may enable a user to perform a series of "drag and drop" operations to specify the data protection intent. A data protection intent may include any combination of the building blocks available for specifying the data protection intent.

The plurality of building blocks may include a GUI item 601 that enables a user to specify a primary site associated with a disaster recovery plan. A primary site may correspond to a datacenter location associated with an entity.

The plurality of building blocks may include a GUI item 602 that enables a user to specify, if needed, a disaster recovery site associated with the disaster recovery plan. The disaster recovery site may correspond to a datacenter associated with the entity that is different than the specified primary site.

The plurality of building blocks may include a GUI item 603 that enables a user to specify a data pool to which the disaster recovery plan is to be applied. The data pool is comprised of one or more data sets. In the event a user adds a plurality of data sets to the data pool, the order in which the disaster recovery plan is to be applied is based on a top-down order. In some embodiments, the order in which the disaster recovery plan is to be applied is based on a bottom-up order. In some embodiments, the one or more data sets are analyzed to determine all of the objects included in the one or more data sets and the disaster recovery plan is applied to the objects included in the one or more data sets independent of the object's membership in a data set.

The plurality of building blocks may include a GUI item 604 that enables a user to specify a target center associated with the disaster recovery plan. In some embodiments, a target center corresponds to a data set. In some embodiments, the target center corresponds to a server or virtual machine that is to receive data associated with one or more objects stored at the primary site. For example, the target center may correspond to a server or virtual machine that is to be used for restore, migration, replication, continuous data protection, etc.

The plurality of building blocks may include a GUI item 605 that enables a user to specify a time delay associated with the disaster recovery plan. The time delay may indicate an amount of time after the data protection intent specification is validated before a disaster recovery plan associated with the data protection intent specification is performed.

In some embodiments, a time delay is specified for a data set included in a data pool. For example, a data management service may be applied to a first data set included in the data pool. The graphical user interface item that enables a user to specify a time delay associated with the disaster recovery plan may enable the user to specify an amount of time before the disaster recovery plan is applied to a second data set included in the data pool.

In some embodiments, a time delay is applied to a data pool. For example, after a disaster recovery plan is validated, the time delay may indicate an amount of time before the disaster recovery plan is to be applied to the data pool.

The plurality of building blocks may include a GUI item 606 that enables a user to specify a script associated with the disaster recovery plan. For example, the script may be a script to validate that a target center has enough storage to perform the disaster recovery plan, a script to check network connectivity to perform the disaster recovery plan, etc.

The plurality of building blocks may include a GUI item 607 that enables a user to specify a protection profile associated with the disaster recovery plan. The protection profile may indicate a RTO, a RPO, and/or IOPS associated with objects included in the specified data pool. The protection profile may indicate a tier associated with objects included in the specified data pool. A tier may be associated with a corresponding RPO, RTO, and/or IOPS.

The protection profile may indicate a frequency at which backups (e.g., continuous, hourly, daily, weekly, etc.) are to be performed for objects included in the specified data pool. The protection profile may indicate a type of backup (e.g., full backup, incremental backup, CDP) that is to be performed for objects included in the specified data pool. The protection profile may indicate a frequency (e.g., one time, daily, weekly, etc.) at which a virus scan is performed on objects included in the specified data pool. The protection profile may indicate a storage tier for objects included in the specified data pool. A tier may be associated with a corresponding RPO, RTO, and/or input/output operations per second (IOPS).

GUI 600 may include a GUI item 630 that enables a user to validate the combination of building blocks that specify the data protection intent.

In the example shown, GUI items 613, 615, 616, 617 are nested within GUI item 611. This indicates that a user has specified the data protection intent to include a primary site 611 having a location of "San Francisco," a data pool 613 having a name of "Mission Critical Billing," a time delay 615 of 5 minutes to applied to the data pool, a script 616 of "PreFailover.bat" to be applied to the one or more objects included in the data pool, and a protection profile 617 that includes a RPO that is less than 5 minutes, a RTO that is less than 5 minutes, and a protection start time of Jul. 9, 2020 at 10:25 am.

GUI item 624 is nested within GUI item 622. This indicates that the user has specified the data protection intent to include a disaster recover site 622 having a location of "Denver," and a target center 624 of "vCenter West 01."

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    monitoring a current configuration of one or more data management services;
    executing a machine learning model that determines the current configuration is insufficient to achieve a data protection intent indicated by a specification of the data protection intent and determines one or more modifications to the current configuration that, when applied, would achieve the data protection intent indicated by the specification of the data protection intent; and
    in response to determining that the current configuration is insufficient to achieve the data protection intent indicated by the specification of the data protection intent, modifying, based on the one or more modifications, the current configuration of the one or more data management services in a manner that achieves the data protection intent indicated by the specification of the data protection intent.

2. The method of claim 1, wherein the data protection intent specifies at least a recovery point objective (RPO) and a recovery time objective (RTO).

3. The method of claim 2, wherein connectivity issues associated with a primary site or a disaster recovery site cause the RPO or the RTO to be unachievable.

4. The method of claim 1, wherein the data protection intent specification specifies a data pool that identifies one or more objects to be included in the data pool when a data management service of the one or more data management services is performed and the data management service to apply to the one or more objects to be included in the data pool.

5. The method of claim 4, wherein the one or more objects to be included in the data pool share at least one of a tag, label, feature, and/or prefix.

6. The method of claim 4, wherein a number of the objects included in the data pool has increased since a previous implementation of the one or more data management services.

7. The method of claim 6, wherein the objects included in the data pool are virtual machines.

8. The method of claim 4, wherein at least one of the one or more objects is a continuous data protection-enabled object.

9. The method of claim 4, wherein the data management service is disaster recovery.

10. The method of claim 1, wherein modifying the current configuration of the one or more data management services in the manner to achieve the data protection intent indicated by the specification of the data protection intent includes determining which of the one or more data management services are needed to implement a modified configuration to achieve the specified data protection intent.

11. The method of claim 1, wherein modifying the current configuration of the one or more data management services in the manner to achieve the data protection intent indicated by the specification of the data protection intent includes determining a corresponding configuration for each of the determined one or more data management services.

12. The method of claim 1, further comprising providing a notification that the current configuration of the one or more data management services is being modified.

13. The method of claim 12, wherein the notification indicates how the current configuration of the one or more data management service is being modified.

14. A computer program product comprising non-transitory computer readable media storing computer instructions that, when executed, cause one or more processors to:
    monitor a current configuration of one or more data management services;
    execute a machine learning model that determines that the current configuration is insufficient to achieve a data protection intent indicated by a specification of the data protection intent and determines one or more modifications to the current configuration that, when applied, would achieve the data protection intent indicated by the specification of the data protection intent; and
    in response to determining that the current configuration is insufficient to achieve the data protection intent indicated by the specification of the data protection intent, modify, based on the one or more determined modifications, the current configuration of the one or more data management services in a manner that achieves the data protection intent indicated by the specification of the data protection intent.

15. The computer program product of claim 14, wherein the data protection intent specifies at least a recovery point objective (RPO) and a recovery time objective (RTO).

16. The computer program product of claim 15, wherein connectivity issues associated with a primary site or a disaster recovery site cause the RPO or the RTO to be unachievable.

17. The computer program product of claim 14, wherein the data protection intent specification specifies a data pool that identifies one or more objects to be included in the data pool when a data management service of the one or more data management services is performed and the data management service to apply to the one or more objects to be included in the data pool.

18. The computer program product of claim 17, wherein the one or more objects to be included in the data pool share at least one of a tag, label, feature, and/or prefix.

19. The computer program product of claim 17, wherein a number of the objects included in the data pool has increased since a previous implementation of the one or more data management services.

20. A system, comprising:
    a memory configured to store instructions; and one or more processors coupled to the memory and
configured to execute the instructions to:
  monitor a current configuration of one or more data
    management services;
  execute a machine learning model that determines the
    current configuration is insufficient to achieve a data
    protection intent indicated by a specification of the
    data protection intent and determines one or more
    modifications that, when applied, would achieve the
    data protection intent indicated by the specification
    of the data protection intent; and
  in response to determining that the current configuration is insufficient to achieve the data protection
    intent indicated by the specification of the data
    protection intent, modify, based on the one or more
    determined modifications, the current configuration
    of the one or more data management services in a
    manner that achieves the data protection intent indicated by the specification of the data protection
    intent.

* * * * *